(12) United States Patent
Michel et al.

(10) Patent No.: US 10,688,553 B2
(45) Date of Patent: Jun. 23, 2020

(54) SOLID SORPTION REFRIGERATION

(71) Applicants: Bruno Michel, Rueschlikon (CH); Patrick Ruch, Rueschlikon (CH)

(72) Inventors: Bruno Michel, Rueschlikon (CH); Patrick Ruch, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 624 days.

(21) Appl. No.: 13/975,869

(22) Filed: Aug. 26, 2013

(65) Prior Publication Data
US 2013/0340253 A1 Dec. 26, 2013

Related U.S. Application Data

(63) Continuation of application No. 13/996,996, filed as application No. PCT/IB2011/055370 on Nov. 30, 2011, now Pat. No. 9,855,595.

(30) Foreign Application Priority Data

Dec. 22, 2010 (EP) .................................... 10196440

(51) Int. Cl.
*B21D 53/02* (2006.01)
*F25B 17/08* (2006.01)
(Continued)

(52) U.S. Cl.
CPC ............. *B21D 53/02* (2013.01); *F25B 15/00* (2013.01); *F25B 17/08* (2013.01); *F25B 35/04* (2013.01);
(Continued)

(58) Field of Classification Search
CPC .......... B21D 53/02; F25B 15/00; F25B 17/08; B25B 35/04; F28F 13/185; Y10T 29/4935; Y10T 29/49359; Y02B 30/64
See application file for complete search history.

(56) References Cited

U.S. PATENT DOCUMENTS 4,795,618 A 1/1989 Laumen
5,585,145 A 12/1996 Maier-Laxhuber et al.
(Continued)

FOREIGN PATENT DOCUMENTS

DE 4405669 A1 8/1995
DE 10207854 A1 2/2003
(Continued)

OTHER PUBLICATIONS

Tevels et al. Machine translation of FR2 803 222 A1, Jul. 2001.*
(Continued)

*Primary Examiner* — Lee A Holly
(74) *Attorney, Agent, or Firm* — Scully, Scott, Murphy & Presser, P.C.; Kevin M. Jordan, Esq.

(57) ABSTRACT

A method of making integrated adsorption and heat exchanger devices for solid sorption refrigeration systems (1). An integrated adsorption and heat exchanger device comprises a solid material having formed therein both a porous adsorption structure, which is pervious to an adsorbate of said system, and a heat exchanger structure, which is impervious to said adsorbate, for heat exchange with the porous adsorption structure in operation of the system.

13 Claims, 4 Drawing Sheets

(51) Int. Cl.
*F25B 35/04* (2006.01)
*F28F 13/18* (2006.01)
*F25B 15/00* (2006.01)

(52) U.S. Cl.
CPC ........... *F28F 13/185* (2013.01); *Y02A 30/276* (2018.01); *Y02A 30/278* (2018.01); *Y02B 30/64* (2013.01); *Y10T 29/4935* (2015.01); *Y10T 29/49359* (2015.01)

(56) References Cited

U.S. PATENT DOCUMENTS

| | | | |
|---|---|---|---|
| 6,126,723 A * | 10/2000 | Drost et al. | 96/4 |
| 7,578,143 B2 | 8/2009 | Critoph et al. | |
| 7,628,942 B1 * | 12/2009 | Miller | C04B 35/5622 264/257 |
| 7,726,139 B2 | 6/2010 | Maier-Laxhuber | |
| 7,802,322 B2 | 9/2010 | Koch et al. | |
| 2003/0015316 A1 * | 1/2003 | Burkay | F28F 1/42 165/179 |
| 2005/0145837 A1 * | 7/2005 | Chan et al. | 257/19 |
| 2007/0095277 A1 | 5/2007 | Mieda et al. | |
| 2007/0131396 A1 | 6/2007 | Yu et al. | |
| 2008/0028787 A1 | 2/2008 | Mieda et al. | |
| 2008/0078532 A1 | 4/2008 | Nagashima et al. | |
| 2009/0117094 A1 | 5/2009 | Leis et al. | |
| 2009/0326279 A1 * | 12/2009 | Tonkovich | B01F 5/0475 568/487 |
| 2010/0044012 A1 | 2/2010 | Sharma | |
| 2010/0146810 A1 | 6/2010 | Struensee | |
| 2011/0048063 A1 | 3/2011 | Carruthers et al. | |

FOREIGN PATENT DOCUMENTS

| | | |
|---|---|---|
| EP | 0 470 886 A1 | 2/1992 |
| EP | 1 535 002 B1 | 6/2005 |
| FR | 2 803 222 A1 | 7/2001 |
| FR | 2803222 A1 * | 7/2001 |
| JP | 2005127683 A | 5/2005 |
| WO | WO 03/019081 | 3/2003 |
| WO | WO 2007/019558 A2 | 2/2007 |

OTHER PUBLICATIONS

Freni et al., "Zeolite synthesised on copper foam for adsorption chillers: A mathematical model", Microporous and Mesoporous Materials, Elsevier Science Publishing, New York, US, vol. 120, No. 3, Apr. 15, 2009, pp. 402-409.
Bonaccorsi et al., "Zeolite coated copper foams for heat pumping applications", Microporous and Mesoporous Materials, Elsevier Science Publishing, New York, US, vol. 91, No. 1-3, Apr. 15, 2006, pp. 7-14.
Wang et al., "Research and development of consolidated adsorbent for adsorption systems", Renewable Energy, Pergamon Press, Oxford, GB, vol. 30, No. 9, Jul. 1, 2005, pp. 1425-1441.
Yong et al., "Adsorption Refrigeration: A Survey of Novel Technologies", 2007 Bentham Science Publishers Ltd., Recent Patents on Engineering 2007, 1, pp. 1-21, Received: Sep. 26, 2006; Accepted: Oct. 14, 206; Revised: Oct. 27, 2006.
Li et al., "Performance study of a consolidated manganese chloride-expanded graphite compound for sorption deep-freezing processes", Applied Energy, 2009, Elsevier, Received Mar. 18, 2008; revised Jun. 2, 2008; accepted Jun. 3, 2008; last printed Oct. 12, 2010, pp. 1-2.
Office Action dated Apr. 8, 2015, received in a related U.S. Appl. No. 13/996,996.
Office Action dated Feb. 12, 2016 received in a related U.S. Appl. No. 13/996,996.
Office Action dated Dec. 9, 2016, received in a related U.S. Appl. No. 13/996,996.
Brunschwiler et al, "Toward zero-emission data centers through direct reuse of thermal energy", IBM J. Res. & Dev., vol. 53, No. 3, Paper 11, May 2009, pp. 11:1-11:13.

* cited by examiner

SOLID SORPTION REFRIGERATION

CROSS-REFERENCE TO RELATED APPLICATION

The present disclosure is a continuation application claiming the benefit of co-pending U.S. patent application Ser. No. 13/996,996 filed on Jun. 21, 2013, the entire contents of which are incorporated by reference as if fully set forth herein.

This invention relates generally to solid sorption refrigeration and, more particularly, to adsorption and heat exchanger devices for use in solid sorption refrigeration systems together with methods for making such devices and apparatus and systems incorporating these devices.

Solid sorption refrigeration systems are driven by the adsorption and desorption of a refrigerant vapor (the adsorbate) by a solid substance (the adsorbent). In contrast to conventional vapor-compression cooling systems driven by a mechanical compressor, no electrical energy is needed to drive the refrigeration cycle. The basic cycle involves an adsorption phase and a desorption phase. In the adsorption phase, the refrigerant vapor is adsorbed by the adsorbent substance resulting in release of heat. In the desorption phase, heat is applied to the adsorbent causing desorption of the refrigerant. The heat transferred during these processes is conveyed by a heat exchanger between the adsorbent and a heat transfer fluid of the system. The heat transfer fluid is therefore heated to a high temperature to supply the working heat required for desorption and cooled to a low temperature to receive the heat rejected during adsorption. The adsorption and desorption processes occur in conjunction with evaporation and condensation of refrigerant in an evaporator/condenser. In a simple system, the adsorbate vaporized during the desorption phase is supplied from the adsorber unit to a condenser where the vapor condenses, rejecting heat, under the high pressure resulting from the desorption process. After heat rejection in the condenser, the liquid refrigerant is passed through a control device (e.g. an expansion valve or syphon) into an evaporator of the system. Here, the reduced system pressure causes the condensed refrigerant to vaporize. Heat is extracted from the environment during evaporation, resulting in refrigeration. Readsorption of the refrigerant vapor occurs in the adsorber unit during this process, reducing system pressure and promoting vaporization, until the adsorbent is saturated with refrigerant vapor.

The refrigeration cycle can be used for heating or cooling an environment by exploiting either the release of heat during condensation or the extraction of heat during vaporization. Continuous heating or cooling can be obtained by operating plural adsorber units with an appropriate phase shift between the operating cycles in each. For example, two units can be run in antiphase, or four units with a 90° phase shift, and so on. In any case, system operation is driven entirely by heat input during the desorption phase without further input of mechanical work. Solid sorption cooling is therefore particularly preferred over conventional vapor-compression cooling where excess heat is readily available, e.g. from natural sources or as a by-product of another process. For instance, the availability of a plentiful heat supply from the sun often goes hand-in-hand with the need for cooling, leading to a variety of solar cooling applications for this technology. Further, the refrigerant used in solid sorption systems is typically water or methanol. Both of these are environmentally friendly and do not contribute to global warming, unlike the fluorocarbon refrigerants typically used in vapor-compression systems.

In view of current trends toward waste-heat reuse and tri-generation systems (simultaneous production of electricity, heating and/or cooling), heat-driven refrigeration technologies are expected to grow in significance, alleviating electricity demand and contributing to improved energy efficiency generally. However, the cooling power of solid sorption refrigeration systems is very small compared to vapor-compression systems of the same size. The main reason for this is sluggish heat transport, resulting in slow adsorption and desorption cycles. In particular, the specific cooling power of solid sorption systems is limited by poor heat transfer characteristics between the heat transfer fluid and the adsorbent material. The limiting overall heat transfer coefficient in solid sorption systems depends on flow of heat from the heat transfer fluid to the heat exchanger and from the heat exchanger to the adsorbent material. The specific cooling power is dependent on the overall heat transfer coefficient as well as heat flow within the adsorbent material itself.

In first-generation adsorption refrigeration systems, the adsorber units used powder beds. In these units, a bed of loose adsorbent powder lying on the metal heat exchanger surface formed the basic adsorption device. In a typical such bed, the adsorbent powder might have a thermal conductivity $\lambda$ in the region of 0.1 W/(m·K). This value is significantly lower than the bulk material (glass 5 W/m·K; carbon 100 W/m·K) because of the high void fraction, the thermal interfaces between the particles, and the tortuous heat path. A typical value for the overall heat transfer coefficient h between the heat transfer fluid and adsorbent material might be in the region of 20 W/(m²·K). Efforts to improve the specific cooling power of these systems included the use of monolithic adsorbents instead of granular adsorbent material and use of adsorbent materials with high thermal conductivities. Consolidated adsorbent materials have been formed of graphite, metallic foams, or adsorbent grains bound in a matrix such as resin. Composite adsorbent materials have also been produced from a mixture of adsorbent particles and particles with higher thermal conductivity. With such materials, the heat transfer coefficient h might be increased to around 200 W/(m²·K) with a thermal conductivity $\lambda$ in the region of 0.3 W/(m·K). However, these consolidated materials generally suffer from poor permeability to the adsorbate vapor. More recently, heat transfer at the thermal interface between the heat exchanger and adsorbent material has been improved by coating the heat exchanger fins or tubes with the adsorbent material, either dispersed in a suitable matrix or by direct synthesis of the adsorbent, usually a type of zeolite, on the external heat exchanger surface. Heat transfer coefficients h in the region of 1000 W/(m²·K) have been achieved in such systems. In other approaches, the shape, arrangement or coupling of the heat exchanger channels or pipes have been addressed with a view to improving the performance, cost, reliability or compactness of the heat exchanger itself. In spite of all the foregoing improvements, however, the overall heat transfer coefficient remains undesirably low in solid sorption refrigeration systems, thus limiting the rate of cooling achievable for a given rate of heat input and a given area of heat exchanger and adsorbent material.

One embodiment of an aspect of the present invention provides an integrated adsorption and heat exchanger device for a solid sorption refrigeration system. The device comprises a solid material having formed therein both a porous adsorption structure, which is pervious to an adsorbate of said system, and a heat exchanger structure, which is impervious to said adsorbate, for heat exchange with the porous adsorption structure in operation of said system.

In devices embodying this invention, the adsorption and heat exchanger structures are integrated in the same solid material with the adsorption structure being a porous structure in this material. A continuous solid phase may therefore be obtained in which heat flow is facilitated. In devices embodying this invention, since the heat exchanger and porous adsorption structures are formed of the same material as an integral unit, thermal interfaces present in prior devices can be eliminated. This in turn leads to improved heat transfer coefficients with improvements in performance. In addition, thermal conductivity may be enhanced in devices embodying the invention by virtue of the continuous solid phase in the adsorbent structure. These features enable the integrated device to be heated to a desired temperature efficiently. The integrated structure also allows the distance between the heat transfer fluid and the adsorbent medium to be reduced compared to prior systems, further enhancing heat transfer between the two. Moreover, the adsorption structure is pervious to the adsorbate by virtue of its inherent porosity, the network of pores providing an extensive and fully accessible adsorption surface. This offers high permeability to the adsorbate vapor, with fast vapor access, promoting efficiency of the adsorption process. Inactive thermal mass in the adsorption/heat exchanger structures can also be reduced compared to prior systems, leading to higher coefficients of performance. The higher specific cooling powers achievable with integrated devices embodying the invention may allow refrigeration systems to be made more compact. Overall, therefore, embodiments of the invention may offer performance improvements in solid sorption refrigeration systems, allowing efficient operation and reduced cycle operating times.

Devices embodying the invention may be formed of various materials using a variety of techniques. Device functionality clearly demands a material with good thermal conductivity $\lambda$, and in general the higher $\lambda$ the better. Materials having thermal conductivities greater than the $\lambda \approx 0.1$ W/(m·K) of early powder beds can be readily selected. Preferred materials have bulk thermal conductivities of at least about 5 W/(m·K), with values of at least about 100 W/(m·K) being more preferable. Another factor affecting material selection is suitability for particular processing technique(s) to be used for forming the adsorbent and heat exchanger structures of the device. A variety of techniques can be employed here as discussed in more detail below. In preferred embodiments, a material is selected which lends itself well to micromachining and the synthesis of a suitable porous adsorption structure, examples here being silicon or glass-like carbon. Other suitable materials include ceramics such as TiC or SiC, in which porosity can be induced by chlorination for example, and metals such as Al, Cu or Ni in which porosity can be induced by dealloying for example. Exemplary processing techniques and materials are discussed in more detail below.

The adsorption structure of the integrated device is that part of the device in which adsorption/desorption occurs in use. The porosity of this structure allows the adsorbate vapor to permeate and pervade throughout the structure during adsorption. In some embodiments, the porous adsorption structure is inherently adsorbent by virtue of its porosity. Alternatively, or in addition, adsorbency may be provided or enhanced by application of adsorbent material to the basic porous structure. In some embodiments, therefore, the porous adsorption structure may have an adsorbent material deposited on the pore surfaces thereof. For example, adsorbent material can be deposited on the surfaces of the pores in a macroporous or mesoporous structure to form an adsorbent coating for these internal surfaces. Such an adsorbent coating (which need not be a uniform or continuous layer) can bring the dimensions of the resulting apertures, or clefts, which are exposed to the adsorbate down to the nanometer level, thereby promoting efficient adsorption. Here, the underlying microporous structure provides an extensive internal surface area for adsorption to occur and inherent ease of access for adsorbate throughout the structure.

The heat exchanger structure of the integrated device is impervious to the adsorbate vapor, inhibiting passage and hence escape of the vapor through the heat exchanger structure. This structure effects the heat exchange between the porous adsorption structure and the environment which occurs during the adsorption and desorption processes in system operation. Simple systems can be envisaged in which heat transfer between the environment and heat exchanger structure occurs by direct irradiation or convection, and the heat exchanger structure may be adapted appropriately for such systems. More usually, however, the heat exchanger structure is adapted for direct contact with a heat transfer fluid of the system to exchange heat between the fluid and the porous adsorption structure.

The particular form of the heat exchanger structure can vary in embodiments of the invention, and in general the heat exchanger structure may have a variety of overall shapes with or without additional surface features. In a particularly simple embodiment, for instance, the heat exchanger may simply comprise a generally flat layer of the device material having a smooth or patterned surface. Typically, however, the heat exchanger structure will have projecting surface formations to increase the surface area for heat transfer, e.g. the surface area exposed to heat transfer fluid in use. The projecting surface formations could be formed, for instance, by bends or folds in the device itself or by projections such as fins which extend outwardly from the fluid-facing surface of device. Projections such as fins can also serve to channel the fluid effectively along its flow path in use. In other embodiments, the integrated device may be formed as a cylinder or similar closed entity with the heat exchanger structure comprising the inner surface layer in the form of a pipe for conveying the heat transfer fluid. Numerous other forms of structure can be envisaged, however, and in general a heat exchanger structure may be formed to contain or channel the heat transfer fluid or may simply provide for passage of this fluid over the heat exchanger surface.

The porous adsorption structure may also take a variety of forms, from a simple porous layer to a more complex structure. As discussed for the heat exchanger, the outside, adsorbate-facing surface of the adsorption structure could be generally smooth or could have projecting surface formations like folds or fins to increase the surface area exposed to adsorbate and possibly also channel the adsorbate along its flow path.

In a particularly preferred embodiment, the integrated device comprises a layer of the solid material having the porous adsorption structure and the heat exchanger structure formed in opposite surfaces thereof. This constitutes an efficient arrangement in which the distance between the heat exchanger and adsorption structures can be minimized to give optimum heat transfer between the two. The basic layer here could be a generally flat, sheet-like layer, or may be folded, bent or otherwise shaped in some fashion and/or formed into a closed structure such as a pipe with a cylindrical, hexagonal or other cross-sectional shape. Closed pipe-like devices can conveniently contain and channel one or both of the heat transfer fluid and adsorbate as mentioned above. More than one such device may be used to form adsorption/heat exchanger apparatus embodying the invention. An exemplary apparatus may comprise two layers as described above with the two heat exchanger structures (or the two adsorption structures) facing one another, thereby doubling the active surfaces. A particular adsorption unit may employ a stack of these bi-layer modules. Pipe-like arrangements can similarly be formed of more than one basic device layer, and more than one pipe can be employed in an adsorption unit, e.g. in stack of parallel pipes. Hexagonal or other such cross sections may be particularly convenient here to allow a group of adjacent pipes to fit together efficiently. Numerous other constructions can be envisaged based on the fundamental integrated adsorption/heat exchanger devices described.

An embodiment of a second aspect of the invention provides a method for making an integrated adsorption and heat exchanger device for a solid sorption refrigeration system. The method comprises forming in a solid material both a porous adsorption structure, which is pervious to an adsorbate of said system, and a heat exchanger structure, which is impervious to said adsorbate, for heat exchange with the porous adsorption structure in operation of said system.

In some methods embodying the invention, the basic solid material is non-porous and the method includes forming the porous adsorption structure by processing a portion of the solid material to render that portion porous and therefore pervious to the adsorbate. In some cases, this step may inherently also form the heat exchanger structure as simply the remaining, non-porous portion of the device. In other cases, formation of the final heat exchanger structure may involve additional processing, such as machining of fins for example.

Embodiments can also be envisaged in which the basic solid material is porous, the method including forming the heat exchanger structure by processing a portion of the solid material to render that portion non-porous and hence impervious to adsorbate. Again, such a step may inherently also form the adsorption structure as simply the remaining, porous portion of the device, or additional processing may be required for this purpose.

Some methods embodying the invention may include depositing an adsorbent material on the pore surfaces of the porous adsorption structure to provide or enhance adsorbency as discussed above. Methods may also include forming projecting surface formations on at least one of the porous adsorption structure and the heat exchanger structure as discussed above.

In general, where features are described herein with reference to a device embodying the invention, corresponding features may be provided in a method embodying the invention, and vice versa.

Preferred embodiments of the invention will now be described, by way of example, with reference to the accompanying drawings in which.

Figure 1A:
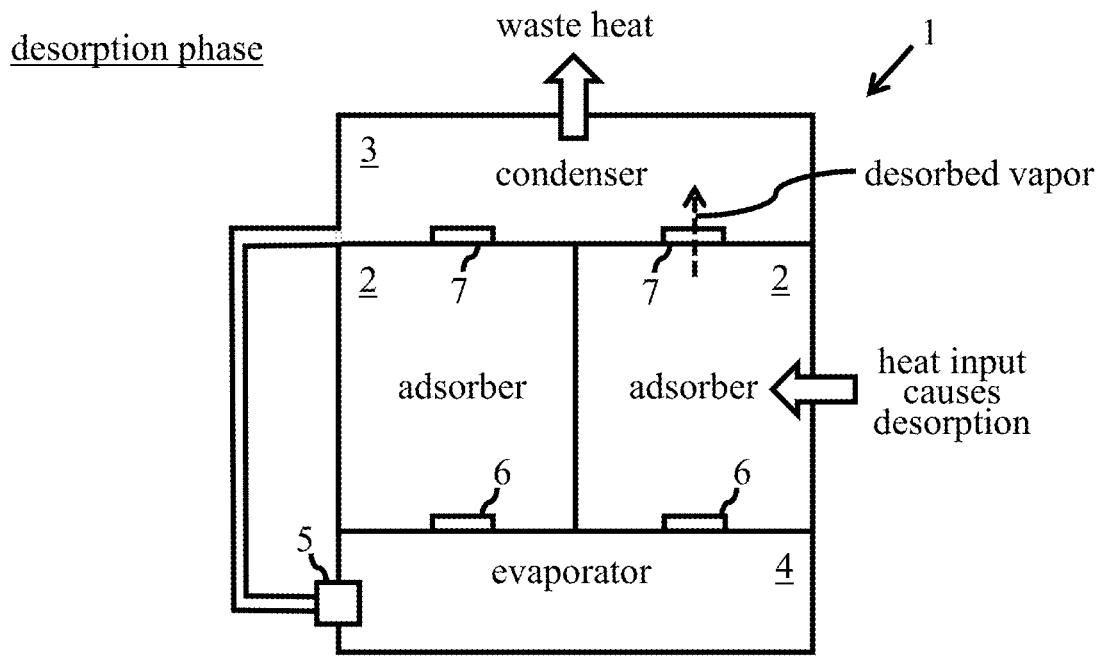
FIGS. 1a and 1b illustrate different operating phases of a solid sorption refrigeration system.
Figure 1B:
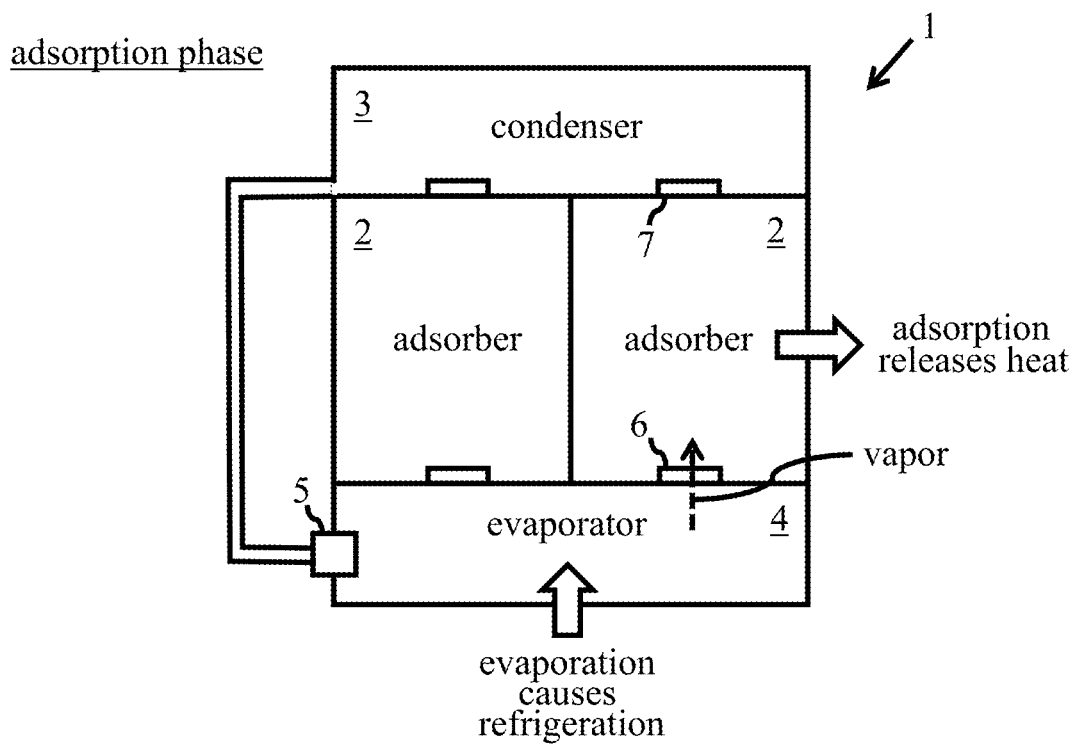

FIGS. 1a and 1b are schematic illustrations of an exemplary solid sorption refrigeration system 1 in which integrated adsorption and heat exchanger devices embodying the invention may be employed. The two figures illustrate the two main phases of the refrigeration cycle, with the solid arrows representing heat flow in each case. This simple system includes adsorber apparatus, consisting of two adsorber units 2, a condenser 3 and an evaporator 4. A pipe for passage of condensate from condenser 3 to evaporator 4 terminates in a control device 5, here an expansion valve. The adsorber units 2 are connected to evaporator 4 and condenser 3 via one-way valves 6, 7 as indicated in the figure.

Each adsorber unit 2 of the system comprises a plurality of integrated adsorption/heat exchanger devices to be described in detail below. These devices are arranged in each unit such that refrigerant vapor, received from the evaporator 4 via valve 6 during the adsorption phase, flows over the adsorbent structures of the devices and is channeled via these structures toward condenser 3 during desorption, escaping from the unit via valve 7 during this phase. During these processes, a heat transfer fluid (HTF), usually water-based, flows over the heat exchanger structures of the integrated devices and is channeled by these structures between fluid inlets and outlets (not shown in the figures) of unit 2. Three reservoirs (not shown) at different temperatures are employed for operation of the system 1: a high temperature ("hot") reservoir, a low temperature ("chilled") reservoir, and an intermediate temperature ("cold") reservoir as discussed further below. In practice, each reservoir may be connected to the system in FIGS. 1a and 1b by separate HTF loops. The particular mechanisms via which the refrigerant and HTF are delivered to and from the integrated adsorption/heat exchanger devices in each adsorption unit 2 will depend on the precise form and arrangement of these devices. Such mechanisms are, however, generally known in the field of adsorption systems, and suitable mechanisms for a given case will be apparent to those skilled in the art.

The basic operating cycle is illustrated in the figures for the right-hand adsorber unit 2. FIG. 1a illustrates the desorption phase of the cycle. At the start of this phase, the refrigerant fluid (e.g. water or methanol) is fully adsorbed within adsorber unit 2. The adsorber unit is then heated by supplying hot HTF to the unit. Heat is thus transferred via the heat exchanger structures to the adsorbent structures, causing evaporation and hence desorption of the refrigerant. The refrigerant vapor passes via valve 7 to condenser 3 where the vapor condenses under the high pressure resulting from the desorption process. Heat is rejected to the environment during this process and transferred to cold HTF. The adsorption phase commences when condensation is complete. The liquid refrigerant is passed though expansion valve 5 into evaporator 4 causing partial vaporization. As shown in FIG. 1b, the reduced pressure in evaporator 4 results in further evaporation of refrigerant, drawing heat from the environment during this process and thus causing environmental cooling and a low temperature of chilled HTF. Refrigerant vapor passes via valve 6 to adsorber unit 2 and is readsorbed, reducing system pressure and promoting further vaporization. Heat rejected by the refrigerant during adsorption is transferred via the heat exchanger structures in the unit 2 to cold HTF at intermediate temperature. The adsorption phase continues until the refrigerant is fully adsorbed and the cycle is then complete.

To obtain more continuous cooling, the left-hand adsorber unit in system 1 can be driven in antiphase with the right-hand unit. Thus, the adsorption phase of one unit occurs concurrently with the desorption phase of the other unit. While only two adsorption units are provided in the simple system shown, in practice multiple units can be operated with appropriate phase shifts to produce more efficient and continuous cooling. Moreover, in simpler systems the heat transfer may be realized by direct irradiation or convection rather than via HTF. In any case, in each adsorption unit 2, the basic cycle is driven entirely by heat input from the HTF (FIG. 1a). This fact makes these systems particularly useful in scenarios where waste or excess heat is readily available. An exemplary application envisaged here, known as solar cooling, is one in which the hot HTF is generated by solar irradiation. Another exemplary application is one in which the hot HTF is provided by waste heat from servers in a datacentre. The waste heat may be collected at a suitably high temperature by appropriate datacentre cooling technology as described, for example, by Brunschwiler et al. in IBM Journal of Research and Development 53(3) (2009) 1-13. The datacentre waste heat is converted to cooling for the datacentre itself or to satisfy other peripheral cooling demand.

Figure 2:
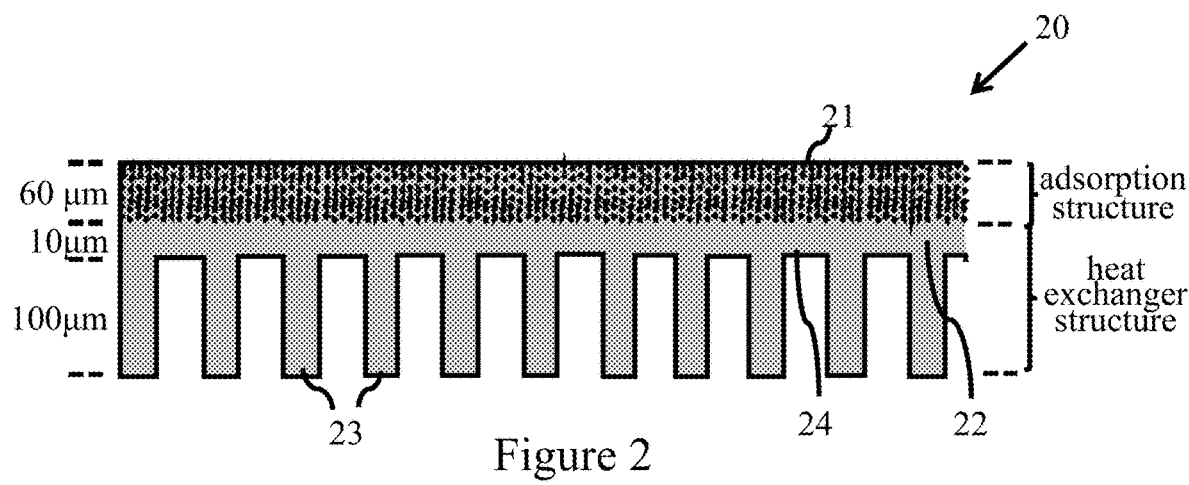
FIG. 2 illustrates a first integrated adsorption and heat exchanger device embodying the invention.

A first embodiment of an integrated adsorption/heat exchanger device which can be used in the above systems will now be described with reference to FIG. 2. The basic structure of the device is indicated by the schematic cross-sectional view shown in the figure. The integrated device 20 of this embodiment is in the form of a generally flat layer, or sheet, of solid material which has a porous adsorption structure 21 formed in one surface and a heat exchanger structure 22 formed in its opposite surface. The adsorption structure 21 comprises a surface layer of the device 20 which has been processed as described below to make this layer porous and hence pervious to the adsorbate to be used with the device. In this example, the adsorption structure has a thickness of approximately 60 μm and a pore size of less than about 10 nm. (The actual adsorption layer thickness, structure and pore size will depend on the particular materials and processes employed as discussed further below, but pore sizes of less than about 10 nm are preferred for effective adsorption with smaller pore sizes, e.g. less than about 2 nm, being ideal.) The remaining, non-porous portion of the device forms the heat exchanger structure 22. This structure has a series of fins 23 projecting from the surface 24 thereof. These fins increase the surface area which contacts the HTF in operation, improving heat transfer efficiency, and define convenient channels for conveying HTF in use. Although not illustrated in the figure, the surface fins 23 are hierarchically patterned in this embodiment. That is, the fins are formed in a hierarchically repetitive pattern of larger fins having smaller surface fins which in turn have smaller surface fins, and so on as far as processing techniques (discussed below) allow. Alternative HTF channel structures such as jet-impingement manifolds or flow-by architectures may be readily envisaged by those skilled in the art. Fin height is approximately 100 μm in this example and the distance between the inner heat exchanger surface 24 and the porous adsorption structure 21 is approximately 10 μm.

The nanoscale porosity of the adsorption structure 21 renders this structure inherently adsorbent. In particular, efficient adsorption can occur in this structure without addition of further adsorbent material. The porosity provides an extensive internal surface area for adsorption with a continuous porous network providing ease of access and fast pervasion of adsorbate throughout the structure. The continuous solid phase in adsorption structure 21 enhances thermal conductivity, and all thermal barriers which hamper heat transport in prior devices are eliminated in the integrated device 20. The sheet-like formation of the integrated device 20 also allows minimal separation of the heat exchanger surface 24 (and hence HTF in use) from the adsorption structure 21. This distance is limited only by the need for structural integrity, and distances less than 10 μm may be possible depending on material selection. In any case, a minimal distance here further increases thermal efficiency and also reduces active to dead mass ratio in the device. Overall, therefore, device 20 provides exceptional heat transfer efficiency between HTF and adsorbate in operation of the adsorption system.

Figure 3:
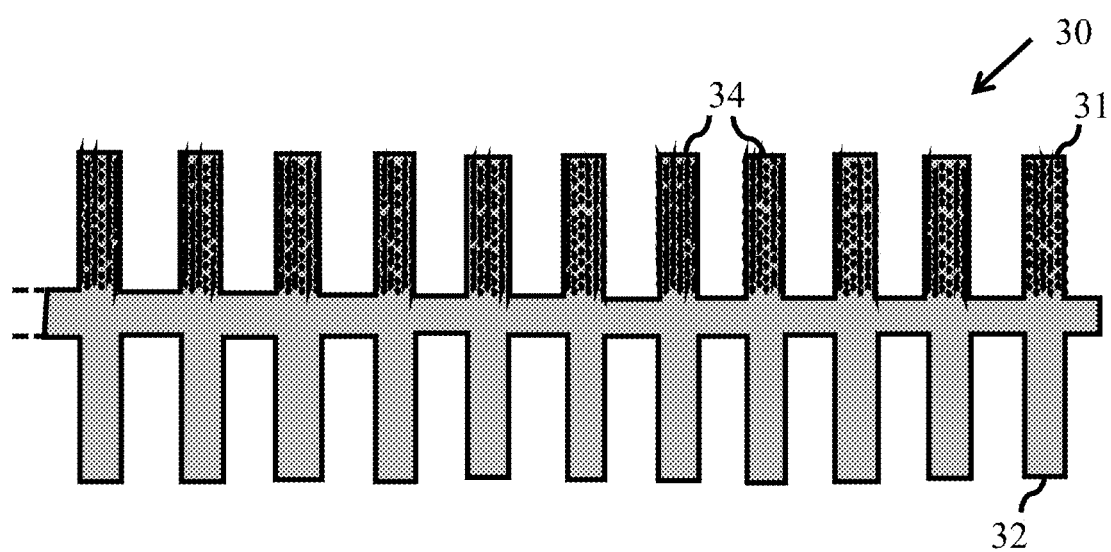
FIG. 3 illustrates a second integrated adsorption and heat exchanger device embodying the invention.

FIG. 3 shows a second, preferred integrated device embodying the invention. The device 30 of this embodiment is generally similar to device 20 above, having a porous adsorption structure 31 and a heat exchanger structure 32 integrally formed in the same solid material. However, the adsorption structure 31 is also formed with projecting surface formations, again in the form of hierarchically patterned fins 34, to increase the surface area exposed to adsorbate for enhanced adsorption efficiency. The resulting channels also direct flow of adsorbate vapor in use. Fins 34 are substantially the same height as the heat exchanger fins in this example, for instance about 100 μm. In general, however, fin height (and the extent of any hierarchical patterning) may differ on both sides and can be varied as required depending on desired characteristics and the particular fluids employed in a system. In some cases, adequate heat transport efficiency may be obtained by forming fins (or other projecting formations) on the adsorption side only of a device. Devices having substantially smooth surfaces (i.e. without projecting formations) on both sides can also be envisaged.

Integrated devices embodying the invention can be formed of a variety of materials using various different processing techniques. By selection of a suitable material for the devices described above, micro-machining technology can be applied to manufacture microchannel manifolds for the heat transfer fluid on one side as well as a porous adsorbent structure on the other side. Hence, the material used preferably lends itself well to micromachining and the synthesis of a suitable porous structure. Thermal conductivity is also implicitly relevant to device functionality, and this property (together with other device parameters) can be selected as required to achieve a desired level of performance. In general, however, the higher the thermal conductivity λ the better the heat transport, and materials having a bulk λ of at least about 100 W/(m·K) are ideally employed.

Figure 4A:
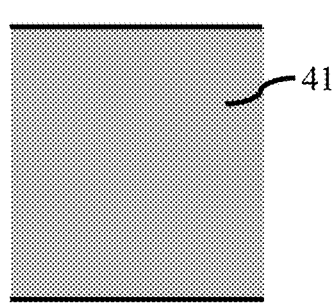
FIGS. 4a to 4d illustrate successive stages in a first method for making an integrated adsorption and heat exchanger device.
Figure 4B:
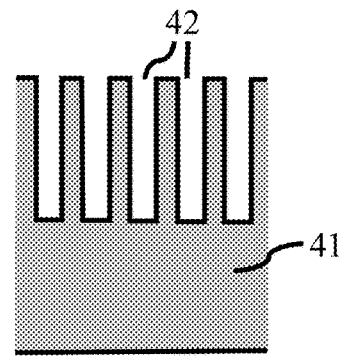
Figure 4C:
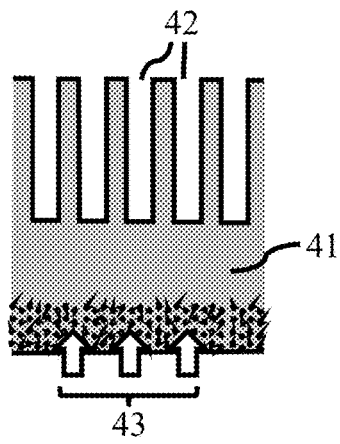
Figure 4D:
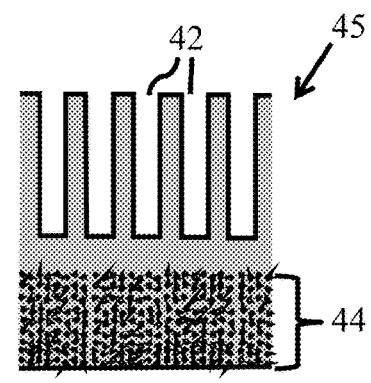

Particularly preferred device fabrication methods employ a "top down" fabrication approach, involving subtractive manufacturing of the various device features. An example of such a method for making the integrated device FIG. 2 will now be described. FIGS. 4a to 4d are schematic illustrations of successive stages in the subtractive manufacturing process. The process uses a monolithic starting material 41, selected among suitable materials described below, as shown in FIG. 4a. In a first step illustrated in FIG. 4b, the HTF channels 42 are fabricated. The adsorbent structure 44 is then introduced by a top-down process, represented by arrows 43 in FIG. 4c, which may involve chemical, electrochemical or physical techniques as discussed below. The duration and intensity of this process is adjusted to obtain the desired thickness of adsorption structure in the final integrated device 45 of FIG. 4d. Variations in the sequence of the processing steps and the directionality of porosity generation depicted in these figures may be desirable depending on choice of starting material.

Figure 5A:
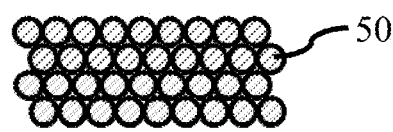
FIGS. 5a to 5d illustrate successive stages in a second method for making an integrated adsorption and heat exchanger device.
Figure 5B:
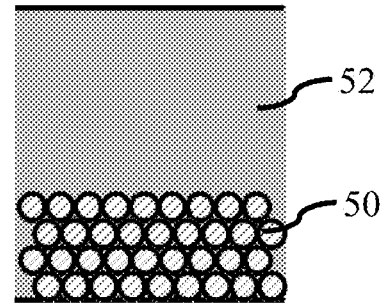
Figure 5C:
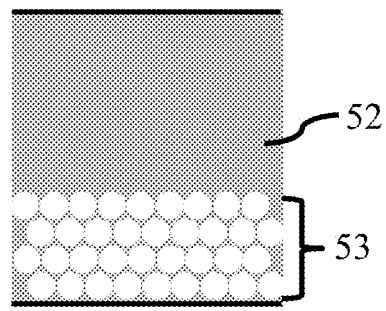
Figure 5D:
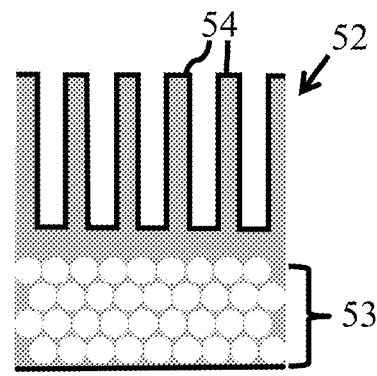

FIGS. 5a to 5d are schematic illustrations of successive stages in another fabrication process which uses templated synthesis based on carbon. In this process, the porous network is defined by a sacrificial template of inorganic material. Examples of template materials which might be used here include zeolites and silica. The template material is granular in form and highly porous itself, with the pore size of the final device being defined by the solid fraction of the template material. In a first step as indicated in FIG. 5a, the inorganic template material 50 is placed in a suitable mold (not shown). Next, as indicated in FIG. 5b, the template material 50 is infiltrated by a suitable carbon source, e.g. a carbonaceous resin, which is subsequently pyrolyzed to deliver a continuous solid phase 52 with a high carbon content. Next, the template material is removed from the carbon phase 52 by a process such as acid leaching to produce the porous adsorption structure 53 shown in FIG. 5c. The HTF channels and fins 54 are then fabricated in the heat-exchanger surface. The resulting integrated device 55 is shown in FIG. 5d.

Techniques to manufacture HTF microchannels, as defined by the (preferably hierarchically patterned) surface fins in the above embodiments, are generally well known in the art and need not be described in detail here. An important aspect of the microchannel design and fabrication is the simultaneous fulfillment of short heat transfer paths from the HTF to the heat exchanger material and an efficient fluid distribution network. A number of hierarchical structures have been devised and demonstrated to achieve this, and these known techniques can be readily employed in embodiments of the invention as will be apparent to those skilled in the art. In preferred embodiments these techniques are also applied to produce hierarchical surface formations on the adsorption structure as in the device 30 of FIG. 3. The particular fabrication process preferred will of course depend on the basic material of the integrated device. Examples of technologies for producing efficient microchannel heat exchanger/adsorption structures include: lithographic techniques based, for example, on anisotropic wet chemical etching or deep reactive ion etching (for instance for silicon or silicon carbide devices); oxygen-ion-beam etching for carbon structures; LIGA (lithography, electroplating and molding) for a variety of materials including metals, ceramics, polymers and glasses; mechanical techniques, e.g. cutting (skiving), milling, electro-discharge, and ultrasonic/waterjet cutting for instance for metal structures; and laser machining, e.g. for carbon.

Adsorption apparatus embodying the invention typically employs a plurality of integrated devices such as those described above. For example, the active surfaces can be doubled by arranging two such devices with like structures (i.e. the two adsorption structures or the two heat exchanger structures) facing one another. As one example of such a "bi-layer module", two devices 20 or 30 could be arranged with their heat exchanger fins interlocking and spaced from one another to define the HTF channels. One of the two devices in such an arrangement may also have a flat heat exchanger surface. Similarly, adsorption modules can be constructed with adsorption structures facing one another. Particularly preferred adsorption units incorporate a stack of such modules to increase the active surface areas in the unit as a whole.

As will be apparent to those skilled in the art, various other fabrication techniques can be used to make integrated devices embodying the invention. Some examples are described in the following.

Porous carbon may be fabricated using various different methods. Expanded graphite may be produced by soaking a suitable graphite in a solution containing an intercalate, such as $H_2SO_4$, followed by heat treatment for removal of the intercalate and concomitant exfoliation of the graphite layers. Glass-like carbon may also be used as a starting material, in which case the inherent closed microporosity can be made accessible by suitable activation techniques including chemical or electrochemical processes. Following activation, the pore sizes obtained are in the nanometer range, thus being suitable per se as adsorbent material as in the devices of FIGS. 2 and 3. Porous carbon structures may also be obtained from silicon carbide or titanium carbide by chlorination. The remaining carbonaceous network is highly porous and suitable for use as an adsorbent structure.

In devices based on silicon as a starting material, a porous silicon structure may be formed in p-type silicon upon anodic polarization in hydrogen fluoride solutions. Conversion of the pore surface to hydrated silica can be achieved by oxidation at moderate temperatures (e.g. 300° C.) and exposure to water. Porous silicon exhibits typical pore diameters below 10 nm and thus offers suitable chemical and structural features to act as adsorbent.

Various other materials and processes for producing devices with inherently adsorbent porous structures will be apparent to those skilled in the art. In other embodiments of the invention, however, adsorbency of the porous adsorption structure may be provided or enhanced by the application of an adsorbent material to the basic porous structure. By way of example, in devices based on metals, various known techniques can be used to produce a porous metal structure with pore sizes in the range of tens of millimetres or larger. Commercially preferred fabrication techniques include: bubbling gas through the melt; stirring a foaming agent into the melt; consolidation of metal powder with a foaming agent; manufacture of ceramic mold from a suitable precursor, followed by burning-out of the precursor. Notably, directional pores may be obtained in metals by unidirectional solidification under pressurized gas. Porous metals which are suitable for heat sink applications and have been produced by the aforementioned methods include aluminium, copper and nickel. In general in these structures, however, the pore sizes are too large, and the associated surface area per given unit volume too small, for direct use as adsorbent material. Here, therefore, the deposition of an adsorbent material on the pore surfaces as an additional layer is preferred. Such an adsorbent coating can be applied using generally known techniques, e.g. by direct synthesis of adsorbent on the porous structure or by application in a suitable matrix. In general, however, it is desirable for such an additional adsorbent material to be as similar as possible to the basic device material in order to minimize thermal interfaces. The closer the speed of sound in the two materials, the less pronounced the thermal interface. Hence, material selection should consider both the material density and the Young's modulus, these properties being the primary factors determining speed of sound in the material. It will be appreciated, however, that the effect of any thermal interface introduced by such a coating will be considerably alleviated by the advantages of the underlying porous structure, this providing an extensive and fully accessible porous network with high permeability and fast access for adsorbate vapor.

Nanoporous metals can be produced by known dealloying techniques. Such materials could be used either with an additional adsorbent coating or in the as-produced state in integrated metal devices embodying the invention, offering a sufficiently large surface-area-to-volume ratio to act directly as an adsorbent. Another method for producing nanoscale porous structures in metals, e.g. aluminium, is anodic oxidation.

When using manufacturing techniques based on porous metals, it may be preferable to manufacture the porous structure prior to micromachining of the HTF channels. It is a feature of the fabrication methods described above that the depth of the porous layer can be controlled during processing so that sufficient bulk material remains for manufacture of the HTF channels. In general, however, the order of processing steps is not critical and could be varied if desired. For example, devices embodying the invention can be produced by first patterning high aspect ratio fins on both sides of a support structure. One side of the structure is then further processed, e.g. by anodic oxidation to produce the adsorption structure while the other side is left with the high aspect ratio fins for the HTF channels. To boost the active to dead mass ratio, adsorbent particles may also be deposited in between the fins on the adsorption structure side. As already discussed, however, such particles should be made from a material as similar as possible to the basic device material in order to minimize thermal interfaces.

In the above processes, the top-down (subtractive) fabrication of the porous structure by chemical, electrochemical or physical means involving foreign species inherently results in an open porous network with fully accessible pores and an intrinsically low tortuosity and high permeability toward the adsorbate vapor. Such a porous structure is clearly superior in terms of sorption kinetics compared to conventional devices such as isotropic granular beds. However, while the described methods involve forming a porous structure in a non-porous starting material, embodiments can be envisaged in which the basic solid material is porous and heat exchanger structure is formed by processing a portion of the solid material to render that portion non-porous. As one example here, porous silica as a starting material could be exposed to pore-blocking agents such as hydrocarbons applied in solution or by vapor deposition processes to create a non-porous heat exchanger structure. Alternative materials and processes here will be apparent to those skilled in the art.

Figure 6:
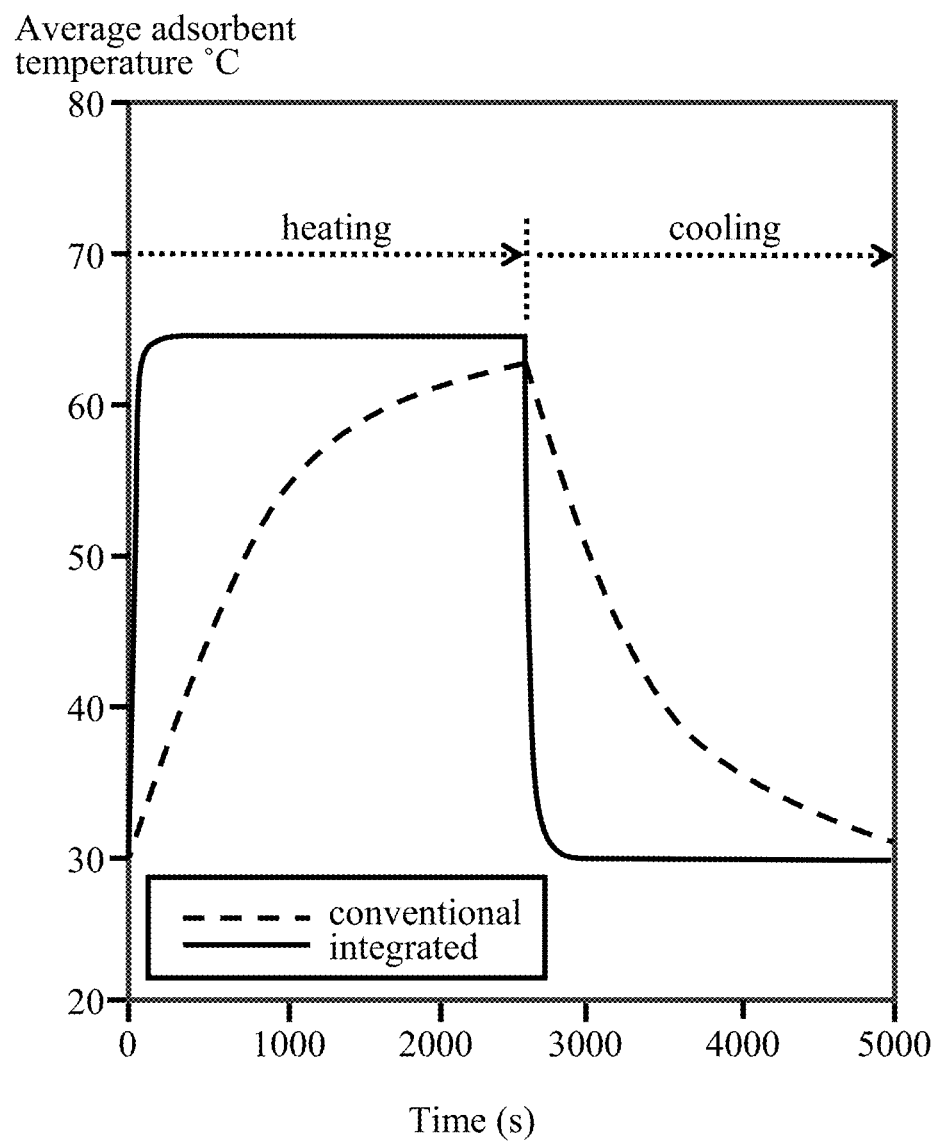
FIG. 6 compares heating and cooling profiles for a conventional adsorbent material and an integrated device embodying the invention.

It will be seen from the foregoing that, by integrating the heat exchanger and adsorption structures in the same material, embodiments of the invention provide highly efficient adsorption and heat exchanger mechanisms for solid sorption refrigeration systems. In particular, the heat transfer coefficient of the integrated heat exchanger/adsorption structure in preferred embodiments is superior to a conventional granular adsorbent bed packed on a metallic heat exchanger by at least two orders of magnitude. Further, the thermal conductivity of the device is superior to the conventional art by at least one order of magnitude by virtue of the continuous solid phase in the adsorbent structure. The time taken to heat the integrated device to a desired temperature is therefore significantly shorter than for the granular adsorbent bed, leading to faster operating cycles and more compact systems with higher coefficients of performance. By way of illustration, the graph of FIG. 6 compares performance of a conventional silica gel-based solid sorption system to an integrated silica heat exchanger/adsorption device embodying the invention. The graph shows the average adsorbent temperature during heating and cooling cycles between a high temperature level (generator temperature) and an intermediate temperature level (adsorber temperature) for constant heat source and sink temperatures of 65° C. and 30° C. respectively. Physical characteristics of porous silica were used to compute the temporal evolution of the temperature profiles. The adsorbent material thickness was 1 cm. The heat transfer coefficients were 20 W/(m²·K) (granular adsorbent) and 2000 W/(m²·K) (integrated device) while the thermal conductivities were 0.1 W/(m·K) and 10 W/(m·K) respectively. As illustrated by the graphical profiles FIG. 6, the time needed to cycle the adsorbent material between the temperature extremes was reduced from 2550 s with the conventional technology to 128 s with the integrated device. Accordingly, the specific cooling power (SCP) was increased by a factor of about 20.

It will of course be appreciated that many changes and modifications can be made to the exemplary embodiments described above. By way of example, surface features other than fins, including various other hierarchically patterned features, can be envisaged. Integrated devices embodying the invention can also be formed with a variety of overall shapes other than the flat, sheet-like structures described above. Such sheets could, for example be formed into pipes having variety of cross-sectional shapes as discussed earlier. Also, in some embodiments heat transfer between the environment and heat exchanger structure could occur by direct irradiation or convection rather than via HTF, and the heat exchanger structure could be adapted accordingly. Heat may, for instance, be supplied by solar irradiation. In this case, the heat exchanger structure of the integrated device could serve as the external housing of the adsorption apparatus.

Adsorber units may contain multiple integrated devices in various arrangements, and more than two adsorber units operating with appropriate phase shifts can be employed to achieve a desired degree of continuous cooling. Multiple units may also be arranged to employ known heat-wave and mass recovery concepts. Heat wave operation is particularly beneficial for low thermal resistance adsorption units since the outflux of the first container can be used to preheat the next container, and so forth. This minimizes the use of energy relative to the amount of desorbed medium.

Many other changes and modifications can be made to the embodiments described without departing from the scope of the invention.

The invention claimed is:

1. A method for making an integrated adsorption and heat exchanger device for a solid sorption refrigeration system, the method comprising:
   forming in a first surface portion of a monolithic solid material an integrated microporous adsorption structure having average pore sizes of <2 nm, which is pervious to an adsorbate of said system, the microporous adsorption structure providing an adsorption function, and
   forming in a second opposite surface portion of the same monolithic solid material an integrated heat exchanger structure, which is impervious to said adsorbate, for heat exchange with the microporous adsorption structure in operation of said system.

2. The method as claimed in claim 1 including forming projecting surface formations on at least one of the microporous adsorption structure and the heat exchanger structure.

3. The method as claimed in claim 2 wherein said projecting surface formations comprise fin structures.

4. The method as claimed in claim 1 further comprising:
   forming projecting surface formations at both the heat exchanger structure to increase the surface area for heat transfer and at the microporous adsorption structure to increase the surface area for enhancing adsorption efficiency.

5. The method as claimed in claim 4 wherein said projecting surface formations are hierarchically patterned.

6. The method as claimed in claim 1 wherein said forming the integrated microporous adsorption structure in said first portion comprises:
   infiltrating an inorganic template material by a carbon source;
   pyrolyzing said template material to provide a continuous solid phase with a carbon content; and
   removing the template material from the carbon content phase to obtain the microporous adsorption structure.

7. The method as claimed in claim 6, further comprising:
   subsequently forming projecting surface formations at said heat exchanger structure to increase the surface area for heat transfer.

8. The method as claimed in claim 1 wherein said monolithic solid material is initially non-porous, the forming the integrated microporous adsorption structure in said first surface portion comprising: processing the first surface portion of the monolithic, non-porous solid material to render that first surface portion microporous.

9. The method as claimed in claim 1 wherein said monolithic solid material is initially microporous, the forming the integrated heat exchanger structure in said second opposite surface portion comprising: processing the second opposite surface portion of the monolithic, microporous solid material to render that second opposite surface portion non-porous.

10. The method as claimed in claim 1 including depositing an adsorbent material on surfaces of the microporous adsorption structure.

11. The method as claimed in claim 1 further comprising: using a top-down processing in forming the integrated microporous adsorption structure in the first surface of said monolithic solid material.

12. The method as claimed in claim 1, wherein a distance between an inner heat exchanger surface of the integrated heat exchanger structure and the porous adsorption structure is about 10 μm.

13. The method as claimed in claim 1, wherein the adsorption structure is formed to have a thickness of about 60 μm.

* * * * *